United States Patent [19]

Anderl

[11] Patent Number: 4,633,771
[45] Date of Patent: Jan. 6, 1987

[54] COFFEE PERCOLATOR

[75] Inventor: Siegfried Anderl, Amstetten, Fed. Rep. of Germany

[73] Assignee: Wuerttembergische Metallwarenfabrik AG, Fed. Rep. of Germany

[21] Appl. No.: 808,856

[22] Filed: Dec. 13, 1985

[51] Int. Cl.4 ........................................... A47J 31/057
[52] U.S. Cl. .................................... 99/280; 99/289 R
[58] Field of Search ................. 99/280, 281, 282, 283, 99/289 R; 426/433

[56] References Cited

U.S. PATENT DOCUMENTS 3,064,553 11/1962 Simjian ............................. 99/289 R
3,288,049 11/1966 Schmid ............................. 99/289 R
3,379,117 4/1968 Richeson ........................... 99/289 R

FOREIGN PATENT DOCUMENTS 2657355 6/1978 Fed. Rep. of Germany .... 99/289 R
402319 5/1966 Switzerland ..................... 99/289 R Primary Examiner—Billy J. Wilhite
Attorney, Agent, or Firm—Arnold, White & Durkee

[57] ABSTRACT

In a coffee percolator having a brewing section, different operating positions are controlled by a control piston driven by a motor by the action of suitable control means. The control piston moves through a coffee meal supply opening and a coffee-grounds flushing opening, both of which are provided in said brewing section, for selectively or contemporaneously opening and closing these openings in the different operating positions. In a brewing position the control piston closes both openings, so that an overpressure is generated within the brewing section. Subsequent to the brewing operation this overpressure is relieved in a relief position by opening the flushing opening while said supply opening remains closed. The relief position is succeeded by a flushing position, in which the supply opening is likewise opened, so that the exhausted coffee-grounds can be flushed out. In one embodiment, the brewing position is followed by the introduction of a short-time flushing water jet for loosening and agitating the coffee-grounds.

6 Claims, 5 Drawing Figures

COFFEE PERCOLATOR

The present invention relates to a coffee percolator comprising a brewing section adapted to have coffee meal and hot brewing water supplied thereto for brewing coffee in said brewing section in a brewing position thereof, and from which the exhausted coffee-grounds are discharged in a flushing position of the brewing section, the various operating positions being determined by a control piston under the action of a motor and control means. The control piston is displaced through a coffee meal supply opening and through a coffee-grounds flushing opening, so as to selectively or contemporaneously open and close the two openings in the various operating positions. The invention also relates to a coffee percolator wherein flushing water is admitted to the brewing section for flushing the exhausted coffee-grounds therefrom.

BACKGROUND OF THE INVENTION

In a coffee percolator of this type, the control piston moves from its brewing position directly to its flushing position, the control piston being designed in such a manner that the supply and flushing openings are opened at the same time by the action of the control means. During the brewing operation, however, a certain overpressure is generated within the brewing chamber. When the two openings are released by the control piston during its movement from the brewing position to the flushing position, this overpressure may cause water vapours to flow towards the coffee meal supply means and to condense therein, causing the coffee meal to coagulate during the following brewing cycle. It is further possible that the pressure relief through the supply opening causes coffeegrounds to be entrained in an uncontrolled manner and to accumulate at undesirable locations. Both these phenomena are highly undesirable for proper operation of the coffee percolator. In the known coffee percolator, moreover, the flushing water is only admitted after the flushing outlet has been opened.

SUMMARY OF THE INVENTION

It is therefore an object of the invention to provide a coffee percolator with a brewing section in which the pressure in the brewing chamber can be relieved after termination of the brewing operation without contamination of the coffee percolator.

It is a further object of the invention to provide a coffee percolator with a brewing section having a plurality of operating positions including a pressure relief position.

It is a still further object of the invention to provide a coffee percolator including a brewing section, in which the coffee grounds flushing operation is improved.

Further objects of the invention will become evident from the description in connection with the drawings.

BRIEF DESCRIPTION OF THE DRAWINGS

An embodiment of the invention shall now be described in deatil by way of example with reference to the accompanying drawings, wherein.

DESCRIPTION OF THE PREFERRED EMBODIMENTS

Figure 1:
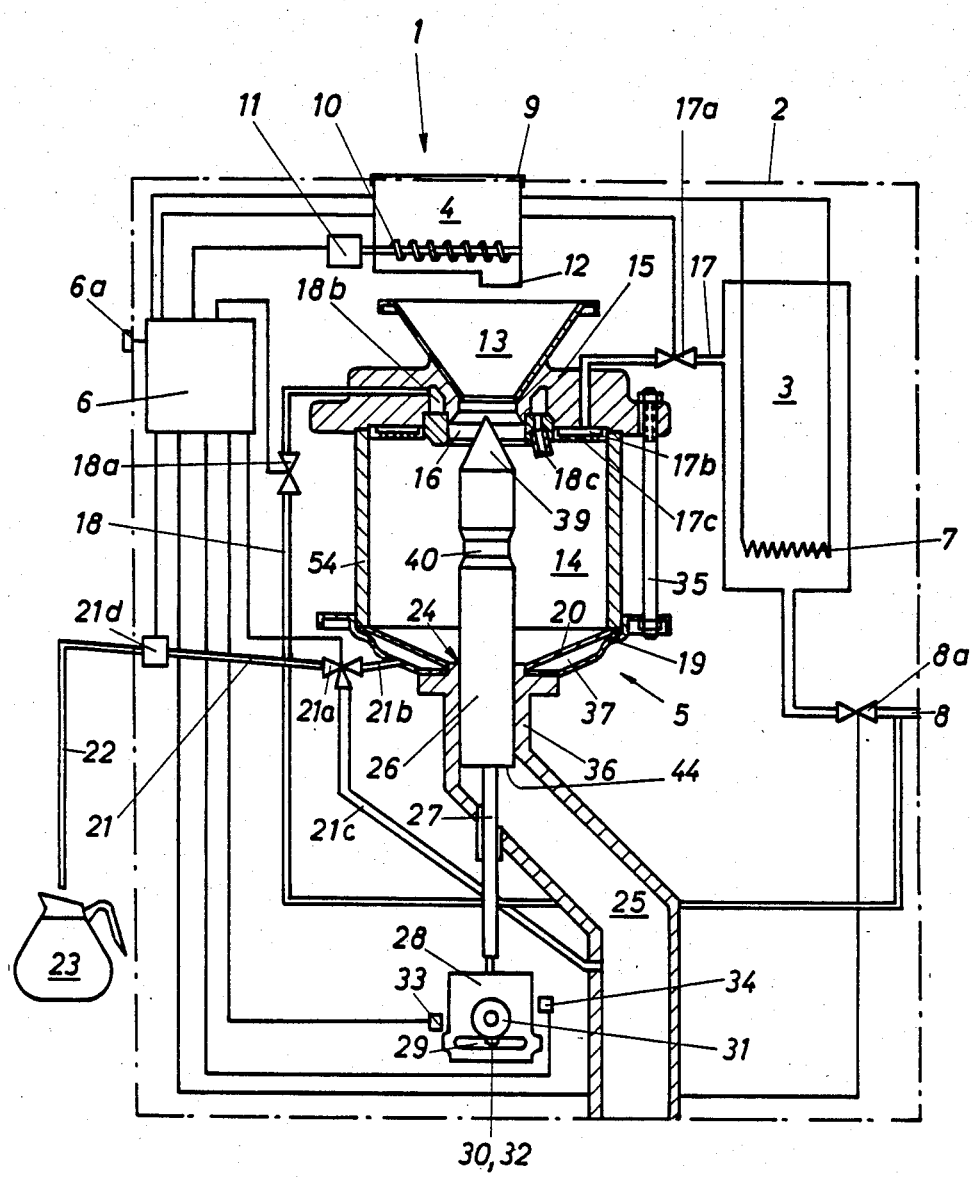
FIG. 1 shows a diagrammatical illustration of a coffee percolator according to the invention.

Diagrammatically shown in FIG. 1 is a coffee percolator 1 having a housing generally indicated at 2. Provided within housing 2 are a water heating container 3, a coffee meal reservoir 4, a brewing section 5, and a control unit 6 adapted to be actuated by means of at least one manual selector switch 6a from the exterior of housing 2.

Disposed within water heating container 3 is a heater 7 for heating the cold water supplied via a cold water conduit 8 including a controlled valve 8a outside housing 2 to its brewing temperature. Valve 8a and heater 7 are controlled by control unit 6.

Coffee meal reservoir 4 has a removable cover 9 for the supply thereto of coffee meal from the exterior of housing 2, and contains a screw conveyor 10 adapted to be rotated by a motor 11 under the control of control unit 6. Screw conveyor 10 is operable to convey coffee meal from reservoir 4 through a discharge opening 12 into a filling funnel 13 of brewing section 5.

Brewing section 5 includes a brewing chamber 14 the upper portion of which is closed by a cover 15 Cover 15 is provided with a first opening 16 through which filling funnel 13 communicates with brewing chamber 14. Extending through cover 15 is a hot water pipe 17 including a controlled valve 17a for admitting the hot water from water heating container 3 to brewing chamber 14 under the control of control unit 6. Also extending through cover 15 is a flushing water pipe 18 including a controlled valve 18a for admitting flushing water from cold water supply conduit 8 to brewing chamber 14 under the control of control unit 6.

The lower portion of brewing chamber 14 is closed by a bottom 19, with a coffee filter 20 disposed thereabove in such a manner that a collecting chamber 37 for the percolated coffee is formed between bottom 19 and coffee filter 20. From collecting chamber 37 an outlet pipe 21 for the percolated coffee extends to the exterior of housing 2. Installed in outlet pipe 21 are a three-way valve 21a communicating with collecting chamber 37 via a pipe conduit 21b, and a flow meter 21d, both of which are connected to control unit 6 via respective electric conductors. Coffee outlet pipe 21 extends to a dispensing outlet 22 adapted to have a suitable receptacle, in the example shown a jug 23, placed therebelow.

The lower portion of brewing chamber 14 is provided with a second opening 24 communicating with a flushing discharge conduit 25 for the exhausted coffee-grounds extending to the exterior of housing 2. Also in communication with discharge conduit 25 is a branch pipe 21c connected to outlet pipe 21 via three-way valve 21a.

First opening 16 and second opening 24 are disposed in coaxial alignment. A control piston 26 is mounted for displacement through first and second openings 16 and 24, respectively, in the vertical direction. Control piston 26 is adapted to assume different operating positions for selectively and successively opening or closing one or both of the openings. The downwards facing side of control piston 26 is provided with a shaft 27 extending through a wall of discharge conduit 25 in a sealing manner. The portion of shaft 27 extending to the exterior of discharge conduit 25 is connected to a link plate 28 formed with an elongate horizontal slot 29 extending therethrough. Slidingly guided in slot 29 is a pin 30 disposed at an eccentric position with respect to the drive shaft 31 of a motor by means for instance of a crank arm 32 or an excenter disk, so that rotation of motor 31 results in a corresponding displacement of link plate 28. This displacement of link plate 28 is effective to actuate two microswitches 33 and 34 disposed at opposite sides of link plate 28. Microswitches 33 and 34 and motor 31 are connected to control unit 6.

Hot water pipe 17 opens into an annular distribution space 17b formed in cover 15 and communicating with brewing chamber 14 through a perforate wall 17c, so that the hot brewing water is evenly distributed oevr the coffee meal supported on coffee filter 20. Flushing water pipe 18 likewise opens into an annular distribution space 18b formed in cover 15 and provided with at least one nozzle 18c for directing a concentrated jet of the flushing water substantially vertically onto the bottom of filter 20. Filter 20 is releasably clamped between bottom 19 and the walls of brewing chamber 14, tension bolts 35 being provided for interconnecting bottom 19 and cover 15 at spaced locations around brewing chamber 14. A tubular sleeve 36 is connected to bottom 19, sleeve 36 containing discharge opening 24 and communicating with discharge conduit 25. The portion of sleeve 36 containing second opening 24 projects into brewing chamber 14, filter 20 being supported on the top surface of the projecting portion of sleeve 36, so that filter 20 cooperates with bottom 19 to define collecting chamebr 37 for the percolated coffee to be discharged therefrom through outlet pipe 21. Control piston 26 is actuated via shaft 27 for displacement in the axial direction of first and second openings 16 and 24, respectively. Over the major part of its length, control piston 26 is of cylindrical shape, and of a dimension permitting it to sealingly close first opening 16 and/or second opening 24 in its respective positions. At its end facing towards first opening 16, control piston 26 is formed with a conical tip 39, a restricted throat portion 40 being formed at a spaced location below conical tip 39. The end of control piston 26 facing away from conical tip 39 is provided with a control edge 44 for cooperation with second opening 24.

The brewing section operates as follows: in the rest position shown in FIG. 1, control piston 26 releases first opening 16 while closing second opening 24. Three-way valve 21a communcates pipe conduit 21b with branch pipe 21c while keeping discharge outlet 22 closed, so that residual beverage or leaking water may flow off through discharge conduit 25.

Operation of manual selector switch 6a for initiating a brewing operation causes three-way valve 21a to be actuated for interrupting communication through branch pipe 21c and for communicating pipe conduit 21b with coffee dispensing outlet 22. At the same time, motor 11 is actuated to rotate screw conveyor 10 for conveying a metered amount of coffee meal through outlet opening 12 into filling funnel 13. This coffee meal drops through opening 16 onto conical tip 39 of control piston 26, whereby it is evenly distributed over the surface area of filter 20. After the selected amount of coffee meal has been so metered, screw conveyor 10 is stopped and control unit 6 acts to displace control piston 26 in a manner to be described. Control piston 26 is thus displaced upwards until both first opening 16 and second opening 24 are sealingly closed. At the same time, valve 17a is opened for admitting hot water to brewing chamber 14 via hot water pipe 17 and through perforate wall 17c so as to be evenly distributed over the coffee meal supported on filter 20. The introduction of the hot water into brewing chamber 14 results in the generation of an overpressure effective to press the hot water through the coffee meal layer to extract the soluble components therefrom. The overpressure is further effective to press the thus percolated coffee from collection chamber 37 into pipe conduit 21b and from there through flow meter 21d into dispensing outlet 22, from where it flows into receptacle 23. After the selected amount of coffee has thus been made, flow meter 21d applies a signal to control unit 6. This causes valve 17a to be closed for stopping the supply of hot water, and three-way valve 21a to be actuated for closing coffee dispensing outlet 22 and for opening branch pipe 21c. Control piston 26 continues to be displaced upwards. Shortly before or shortly after control edge 44 of control piston 26 releases second opening 24 while first opening 16 is still closed, control unit 6 acts to actuate valve 18a of flushing water pipe 18 for a short time, so that a flushing water jet is directed through nozzle 18c onto the coffee-grounds. This flushing water jet is effective to agitate the coffee-grounds immediately above coffee filter 20, so that a major portion thereof is discharged into discharge conduit 25 by the sudden relief of the pressure in brewing chamber 14 as control edge 44 releases second opening 24. At the same time, the cold flushing water jet is effective to cool the steam-air mixture within the brewing chamber, particularly after the coffee has been brewed at very high temperature. In this manner it is ensured that the mixture of water and coffee-grounds in brewing chamber 14 flows into discharge conduit 14 at a reduced pressure. Only after the overpressure in brewing chamber 14 has been fully relieved, the continued upwards displacement of control piston 26 causes restricted neck portion 40 to enter first opening 16, so that both openings 16 and 24 of brewing chamber 14 are now open. Thereupon valve 18a of flushing water pipe 18 is opened for a longer period, so that the coffee-grounds are completely flushed from brewing chamebr 14 and into discharge conduit 25. The restricted neck portion 40 of control piston 26 permits the free entrance of outside air to ensure unimpeded flow-off of the flushing water. After termination of this flushing operation a subsequent brewing cycle may be initiated.

The control of control piston 26 and the different operating positions thereof shall now be explained in detail with reference to FIGS. 2 to 5. It is to be noted that in these figures only the essential components of the brewing section 5 are shown in simplified illustration. The following description also considers only those portions of control unit 6 which are effective for controlling the displacements of the control pistons. In particular, the control procedure for valves 17a, 21a, 18a and 8a, motor 11, flow meter 21d and heater 7 shall not be discussed in detail, as control arrangements for these purposes are sufficiently known to those skilled in the art.

Figure 2:
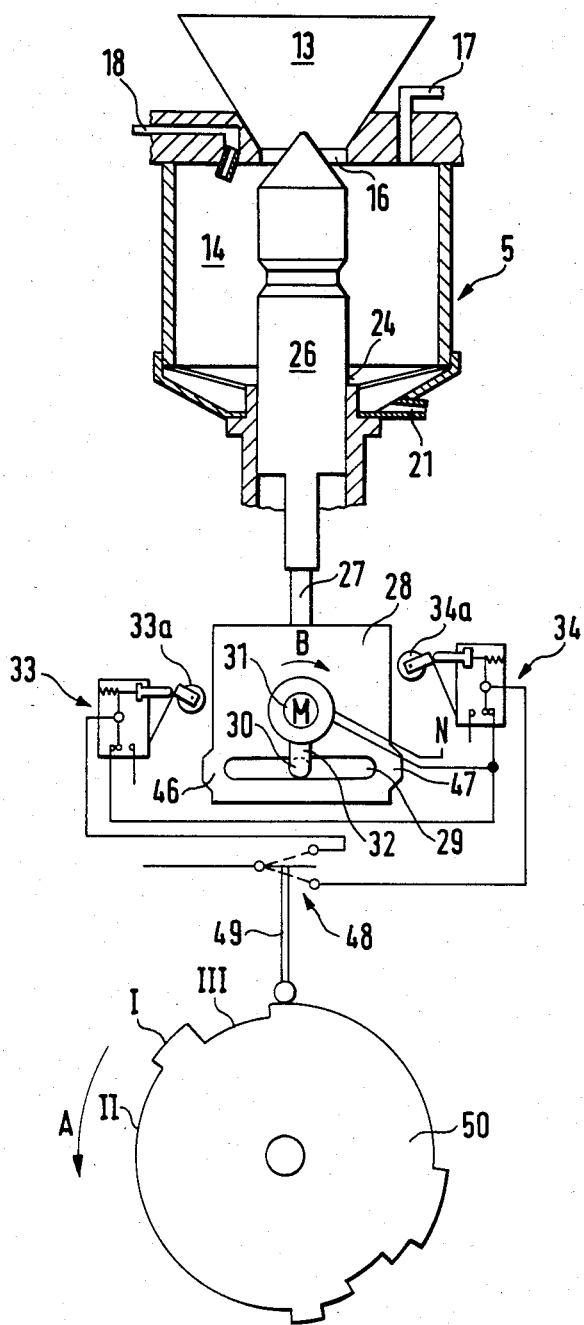
FIG. 2 shows a diagrammatical illustration of a brewing section in a rest position.

In FIG. 2, brewing section 5 is shown in its rest position, i.e. control piston 26 has released first opening 16 while closing second opening 24, control piston 26, its shaft 27 and link plate 28 connected to shaft 27 being at their lowermost position. In this position, pin 30 guided in elongate slot 29 of link plate 28 is likewise at its lowermost position. A pair of cams 46 and 47 project from opposite lateral faces of link plate 28. On the up and down displacement of link plate 28, cam 46 engages a cam follower 33a for actuating the first, i.e. lower microswitch 33, whereas cam 47 engages a cam follower 34a for actuating the upper or seond microswitch 34. Actuation of microswitches 33 and 34 causes the current flow therethrough to be interrupted. The energization of motor 31 is selectively controlled via lower or upper microswitch 33 or 34, respectively.

Control unit 6 includes a switch 48 having a neutral position and two operative positions. In the first operative position, the energization of motor 31 is controlled via lower microswitch 33, while in the other operative position motor 31 is energized through upper microswitch 34.

Switch 48 is actuated to its various positions by means of a plunger 49 scanning the peripheral contours of a rotating cam disk 50. The periphery of cam disk 50 extends at three different switching levels I, II and III. When plunger 49 is brought to first switching level I, it actuates switch 48 to its first operative position. In this first operative position motor 31 is energized through lower microswitch 33. When plunger 48 encounters switching level II, it actuates switch 48 to its neutral position, and when plunger 49 moves to switching level III, it actuates switch 48 to its second operative position, in which motor 31 is energized through upper microswitch 34. The switching levels I, II and III are arranged about the periphery of cam disk 50 in such a manner that the desired operative positions are successively established and maintained for the desired period in each case.

Figure 3:
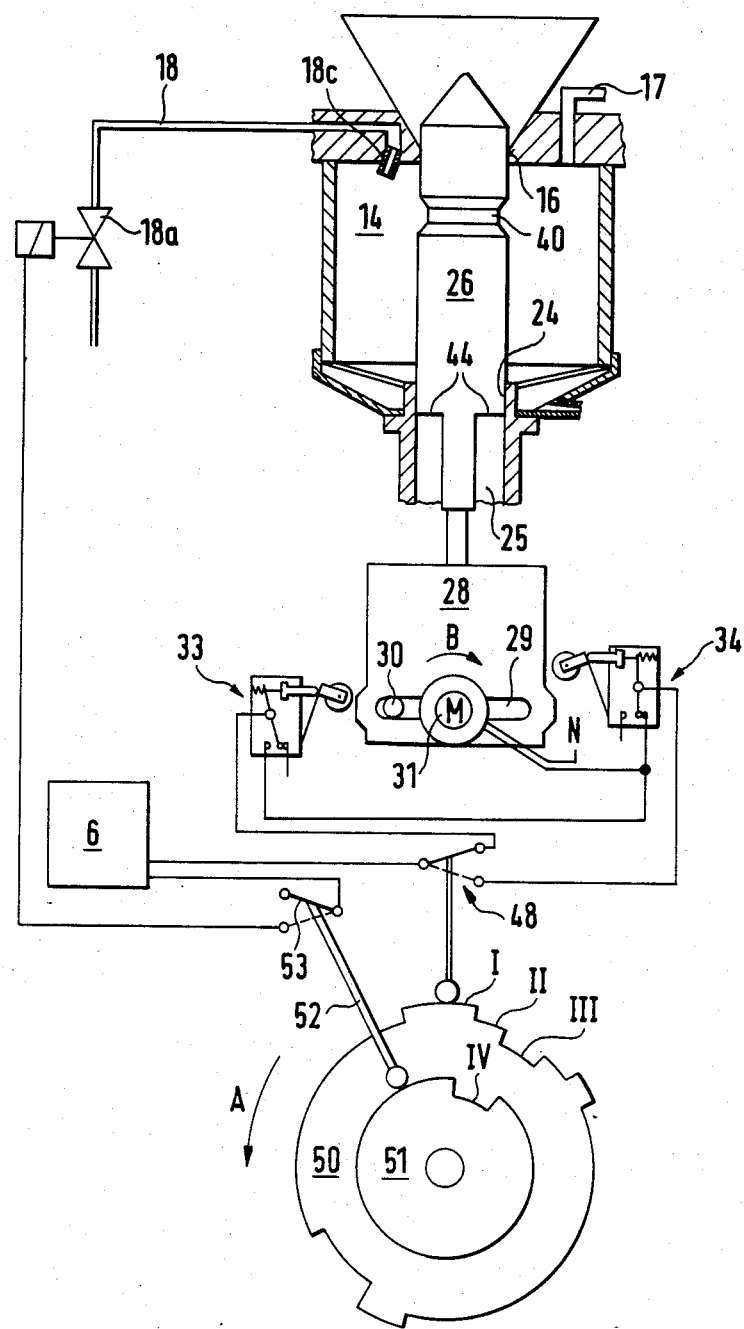
FIG. 3 shows a diagrammatical illustration of a brewing section in a brewing position.

Shown in FIGS. 2 to 5 are four selected operating positions. As already mentioned, FIG. 2 shows the rest position, in which plunger 49 runs on a switching level II of cam disk 50, so that switch 48 is in its neutral position. In this position motor 31 is deenergized. Cam followers 33a and 34a are not engaged. This rest position is maintained until the rotation of cam disk 50 in the direction of arrow A causes plunger 49 to move to another switching level. Prior to the other switching level being reached, brewing chamber 14 is supplied with coffee meal in the manner already described. As shown in FIG. 3, the subsequetn switching level is a switching level I, whereby switch 48 is actuated to its first operative position.

In this first operative position motor 31 is energized through lower microswitch 33. As motor 31 rotates in the direction of arrow B, pin 30 carried by crank arm 32 is displaced within elongate slot 29 of link plate 28, whereby link plate 28 is displaced upwards together with shaft 27 and control piston 26.

As shown in FIG. 3, this upwards displacement is terminated on engagement of cam 46 with cam follower 33a of lower microswitch 33, causing the latter to interrupt the flow of current to motor 31. At the same time the introduction of hot water is initiated in the manner already described. In this brewing position, pin 30, and thus also control piston 26, are at an intermediate position of their upwards movement, at which control piston 26 is effective to close both openings 16 and 24 in the manner already described.

Disposed in parallel to cam disk 50 are a plurality of further cam disks (not shown) rotating in the same direction and with the same rotational speed. These cam disks actuate respective switches for opening and closing valves 8a, 17a, 18a and 21a and for energizing and deenergizing motor 11 at predetermined times of the brewing cycle.

As shown in FIG. 3, one of these further cam disks 50, which although provided in each case is not shown in the remaining figures for the sake of clarity, cooperates with a further plunger 52 for closing a contact 53 to thereby actuating valve 18a. This causes flushing water nozzle 18c to emit one or several short flushing water jets shortly after termination of the brewing operation or on arriving at the pressure relief position shown in FIG. 4. In this manner it is ensured that the agitation of the coffee-grounds takes place immediately before or concurrent with the relief of the overpressure within brewing chamber 14, so that the agitation of the coffee-grounds and the simultaneous discharge thereof is optimized.

Figure 4:
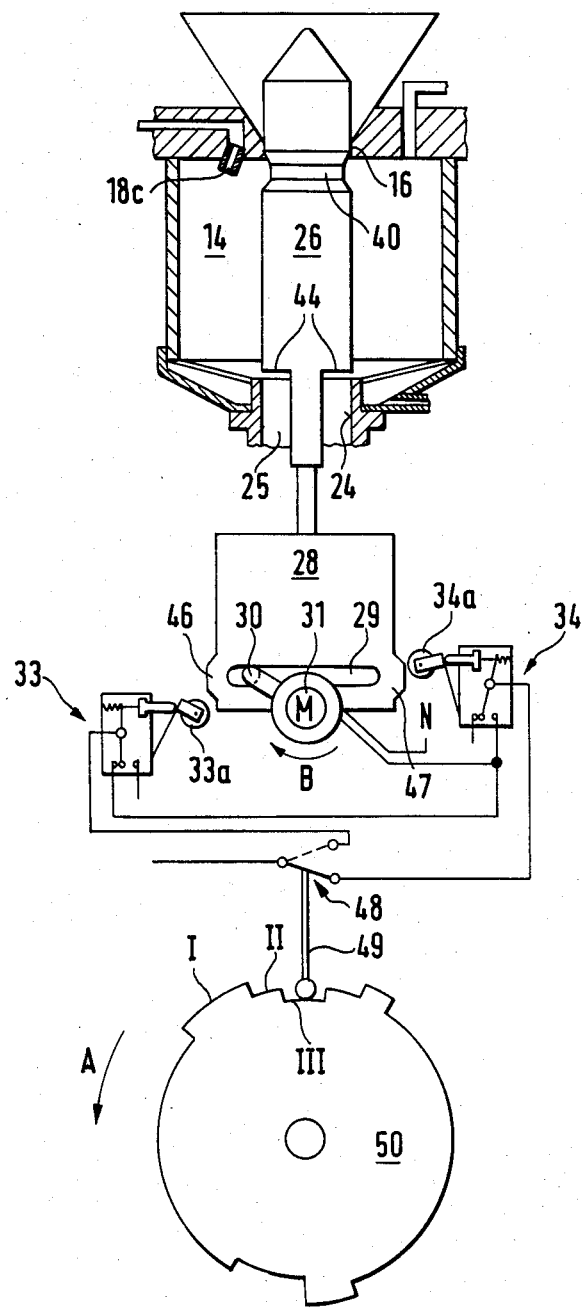
FIG. 4 shows a diagrammatical illustration of the brewing section in a pressure relief position.
Figure 5:
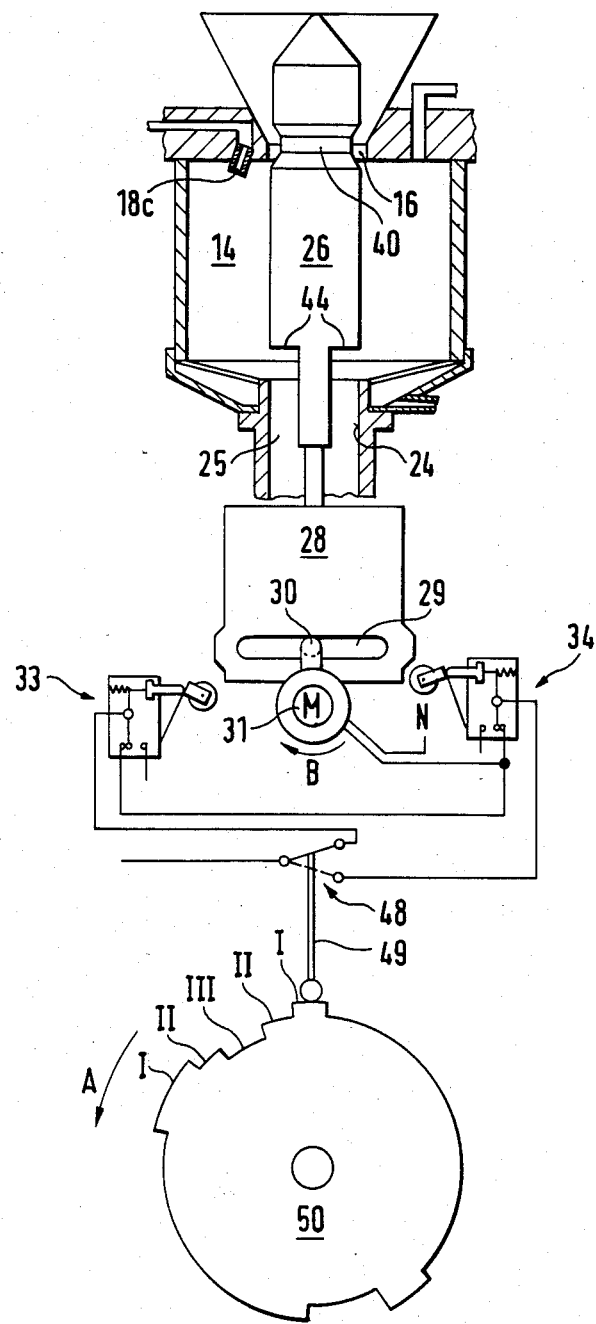
FIG. 5 shows a diagrammatical illustration of the brewing section in a flushing position.

After termination of the brewing operation, plunger 49 moves onto a switching level III on cam disk 50 for energizing motor 31 through upper microswitch 34 as shown in FIG. 4, so that link plate 28 moves to a position at which cam follower 34a of upper microswitch 34 is engaged by cam 47 to interrupt the current supply, so that motor 31 stops and the upwards movement is terminated. Upper microswitch 34 is located at such a position that it is actuated at the instant at which control edge 44 has just left lower opening 24 in an upward direction. In this position restricted neck portion 40 has not yet reached first opening 16, so that it still remains closed. In this position, the overpressure prevailing in brewing chamber 14 is relieved through second opening 24 and discharge conduit 25. Motor 31 remains deenergized during the short interval required for the pressure relief. As shown in FIG. 5, continued rotation of cam disk 50 causes plunger 49 to move to a switching level I, so that motor 31 is now again energized through switch 48 and lower microswitch 33 for further rotation. This results in link plate 28 being lifted to its upper end position in which restricted neck portion 40 is positioned within first opening 16 to establish an annular passage therebetween. This passage permits the inflow of outside air during the flushing operation. Motor 31 remains energized until plunger 49 moves to switching level II, whereby switch 48 is actuated to its netral position for stopping the motor. The rotation of the cam disk is synchronized with the rotation of the motor in such a manner that the switching level II is reached shortly after the motor has passed its top dead center position. In this position both openings 16 and 24 are opened. The flushing operation requires an extended period of time, which may be recognized from the shape of cam disk 50.

As the program proceeds further, plunger 49 is again lifted to switching level I to energize motor 31 through lower microswitch 33. In the course of the downwards movement of link plate 28, lower microswitch 33 is actuated for interrupting the current supply to motor 31, whereupon plunger 49 moves from switching level I to switching level III, so that the supply circuit of motor 31 is now closed via switch 48 and upper microswitch 34. In this manner link plate 28 is moved down to the starting position shown in FIG. 2 together with shaft 27 and control piston 26.

The control of the brewing operation might also be accomplished without the aid of microswitches 33 and 34. In this case a continuously rotating cam disk might be used for opening and closing the current supply circuit of motor 31 at predetermined times of the brewing cycle. The rotation of the cam disk would then have to be very accurately synchronized with the rotation of the motor.

During the brewing cycle cam disk 50 is continuously rotated, so that plunger 49 is moved to its different positions in timed sequence. There is only an exception in the case of the brewing position (FIG. 3). After this brewing position has been attained, cam disk 50 is stopped until a further electric signal is generaetd to indicate the termination of the brewing operation and to start renewed rotation of the cam disk. This signal may for instance be generated by the flow meter after the preselected amount of coffee has passed theretherough.

The invention is not restricted to the described and illustrated embodiment. It is thus readily possible to introduce a flushing water jet into a brewing chamber the control of which does not provide for a pressure relief position. It is also readily possible to operate a brewing chamber with a control piston having a pressure relief position without the introduction of an additional flushing water jet. It is of course also conceivable that the control of the additional flushing water jet may be carried out in a different manner, a variety of generally known control means being available to the skilled artisan for carrying out such a control procedure. Instead of employing the described link plate mechanism for moving the control piston to its different operating positions, it is of course also possible to employ other suitable means to this purpose, for instance a rack and pinion mechanism, a spindle and nut mechanism, a suitably controlled hydraulic piston mechanism or the like.

Further possible modifications within the scope of the claims will be evident to those skilled in the art on studying the preceding description.

I claim:

1. A coffee percolator comprising a brewing section including a coffee meal supply means, a brewing water supply conduit, a brewing chamber for brewing coffee under elevated pressure, and a coffee-grounds flushing conduit, wherein said coffee meal supply means communicates with said brewing chamber through a first opening and said brewing chamber communicates with said flushing conduit through a second opening located below said first opening in coaxial alignment therewith, said first and second openings being operatively associated to a control piston adapted to be displaced to different operating positions by means of a motor under the control of control means, said control piston being positionable in a filling position for opening said first opening and closing said second opening, in a brewing position for closing both said openings, in a flushing position for opening both said openings, and in a pressure relief position between said brewing position and said flushing position for closing said first opening and opening said second opening for relieving the elevated pressure in said brewing chamber.

2. A coffee percolator according to claim 1, wherein said control means include a link plate connected to said control piston and formed with an elongate slot for displaceable engagement by a pin adapted to be moved by said motor along a closed path, the movement of said pin being effective to displace said control piston to its different operating positions.

3. A coffee percolator according to claim 2, wherein said motor is energized and deenergized by means of a cam disk formed with different control levels to be scanned by a plunger.

4. A coffee percolator according to claim 3, wherein said link plate includes a first and a second cam, the movement of said link plate causing said first cam to actuate a first microswitch and said second cam to actuate a second microswitch one after the other in timed sequence, said plunger cooperating with a switch having two operative positions for energizing said motor through said first microswitch in one of said operative positions, and through the other microswitch in the other operative position.

5. A coffee percolator comprising a brewing section including a coffee meal supply means, a brewing water supply conduit, a brewing chamber for brewing coffee, a coffee-grounds flushing conduit, and a flushing water supply conduit opening into said brewing chamber through a nozzle, wherein said coffee meal supply means communicates with said brewing chamber through a first opening and said brewing chamber communicates with said flushing conduit through a second opening disposed below said first opening in coaxial alignment therewith, said first and second openings being operatively associated to a control piston adapted to be sequentially moved to a brewing position and a flushing position, said control piston in said brewing position closing both said openings, and in said flushing position opening both said openings, a flushing water jet being directed into said brewing chamber through said nozzle between said brewing position and said flushing position.

6. A coffee percolator according to claim 5, wherein between said brewing position and said flushing position there is provided a relief position, in which said control piston opens only said second opening, said flushing water jet being supplied subsequent to said brewing position.

* * * * *